US007830543B2

(12) United States Patent
Maki

(10) Patent No.: US 7,830,543 B2
(45) Date of Patent: Nov. 9, 2010

(54) PHOTOGRAPHIC IMAGE REGION EXTRACTING APPARATUS AND COPYING APPARATUS

(75) Inventor: Yoichiro Maki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1162 days.

(21) Appl. No.: 11/129,571

(22) Filed: May 16, 2005

(65) Prior Publication Data
US 2005/0270580 A1 Dec. 8, 2005

(30) Foreign Application Priority Data
May 14, 2004 (JP) ............... P2004-145150
Aug. 26, 2004 (JP) ............... P2004-247041

(51) Int. Cl.
G06K 15/00 (2006.01)
G06K 9/32 (2006.01)
H04N 1/407 (2006.01)
H04N 1/46 (2006.01)

(52) U.S. Cl. ............ 358/1.18; 358/3.26; 358/453; 358/525; 382/300

(58) Field of Classification Search ........ 358/1.18, 358/453; 382/173
See application file for complete search history.

(56) References Cited

U.S. PATENT DOCUMENTS

| 5,946,539 | A * | 8/1999 | Kurimoto ............ 399/372 |
| 5,974,199 | A * | 10/1999 | Lee et al. ............ 382/289 |
| 5,995,661 | A * | 11/1999 | Amidei ............ 382/199 |
| 6,359,702 | B1 * | 3/2002 | Irie et al. ............ 358/1.9 |
| 6,456,732 | B1 * | 9/2002 | Kimbell et al. ............ 382/112 |
| 6,728,005 | B1 * | 4/2004 | Jia et al. ............ 358/3.26 |
| 6,940,526 | B2 * | 9/2005 | Noda et al. ............ 345/629 |
| 2002/0030831 | A1 * | 3/2002 | Kinjo ............ 358/1.9 |
| 2002/0051248 | A1 * | 5/2002 | Cook et al. ............ 358/488 |
| 2003/0048927 | A1 * | 3/2003 | Sato et al. ............ 382/110 |
| 2003/0059111 | A1 * | 3/2003 | Druitt et al. ............ 382/173 |
| 2004/0037583 | A1 * | 2/2004 | Machida ............ 399/100 |
| 2004/0239959 | A1 | 12/2004 | Yada et al. |
| 2004/0247359 | A1 | 12/2004 | Koto et al. |
| 2005/0036708 | A1 * | 2/2005 | Boll ............ 382/283 |
| 2005/0226503 | A1 * | 10/2005 | Bailey et al. ............ 382/173 |

FOREIGN PATENT DOCUMENTS

| JP | 7-170405 A | 7/1995 |
| JP | 08-101566 A | 4/1996 |
| JP | 10-336428 A | 12/1998 |
| JP | 2001-144920 A | 5/2001 |
| JP | 2003-069792 A | 3/2003 |
| JP | 2004-104190 A | 4/2004 |

* cited by examiner

Primary Examiner—Twyler L Haskins
Assistant Examiner—Mesfin Getaneh
(74) Attorney, Agent, or Firm—Sughrue Mion, PLLC

(57) ABSTRACT

A photographic image region extracting apparatus includes: a scanner portion that emits a light to a photographic sheet on which a photographic image is fixed to read a light reflected from the photographic sheet, and outputs image data including the photographic sheet; a photographic sheet extracting portion that extracts a region of the photographic sheet based on the image data output from the scanner; a margin deciding portion that decides presence of a margin around the photographic image based on image data of the photographic sheet region extracted by the photographic sheet extracting portion; and a photographic image extracting portion that specifies a region the photographic image based on a result of the decision of the margin deciding portion and outputs the specified region of the photographic image.

18 Claims, 12 Drawing Sheets

ORIGINAL IMAGE

SCAN IMAGE

BINARY IMAGE

PHOTOGRAPHIC SHEET REGION

7 PIXELS

4 PIXELS

PHOTOGRAPHIC IMAGE REGION EXTRACTING APPARATUS AND COPYING APPARATUS

BACKGROUND OF THE INVENTION

The present invention relates to a technique for copying and more particularly to a technique for copying, without a margin, photographs having the margin and no margin.

For example, JP-A-8-101566 has described an apparatus for removing a margin around a photographic image (a blank around a photographic image) to carry out copying when the sizes of a photographic sheet and a photographic image are predetermined in the case in which a photograph is to be copied by using a copying apparatus.

In the apparatus according to JP-A-8-101566, however, it is impossible to specify the position of a photographic image if the sizes of a photographic sheet and a photographic image are not previously specified, and furthermore, it is impossible to automatically decide whether or not the photographic sheet has a margin (a blank around the photographic image).

SUMMARY OF THE INVENTION

Therefore, it is an object of the invention to automatically detect the region of a photographic image printed on a photographic sheet irrespective of the presence of a margin. It is another object of the invention to provide a technique for copying, without a margin, photographic sheets for printing having the margin and printing having no margin.

In order to solve the aforesaid object, the invention is characterized by having the following arrangement.

(1) A photographic image region extracting apparatus comprising:
- a scanner portion that emits a light to a photographic sheet on which a photographic image is fixed, reads a light reflected from the photographic sheet, and outputs image data including the photographic sheet;
- a margin deciding portion that decides presence of a margin around the photographic image based on the image data including the photographic sheet; and
- a photographic image extracting portion that specifies a region the photographic image based on a result of the decision of the margin deciding portion and outputs the specified region of the photographic image.

(2) The photographic image region extracting apparatus according to (1), further comprising a photographic sheet extracting portion that extracts a region of the photographic sheet based on the image data output from the scanner, wherein the image data includes the margin when the photographic sheet has the margin.

(3) The photographic image region extracting apparatus according to (2), further comprising a shadow detecting portion that detects a shadow generated along at least one of sides of the photographic sheet based on luminance information of the image data output from the scanner portion,
wherein the photographic sheet extracting portion extracts the photographic sheet region based on the shadow detected by the shadow detecting portion.

(4) The photographic image region extracting apparatus according to (1), further comprising a shadow detecting portion that detects a shadow generated along at least one of sides of the photographic sheet based on luminance information of the image data output from the scanner portion,
wherein the margin deciding portion decides presence of a margin for a side on which the shadow of the photographic sheet is generated, and
wherein the photographic image extracting portion specifies the region of the photographic sheet to be the region of the photographic image when the side having the shadow is not provided with the margin.

(5) The photographic image region extracting apparatus according to (1), further comprising:
- a display device that displays the region of the photographic image extracted by the photographic image extracting portion; and
- an input device that accepts a modification input to modify the region of the photographic image extracted by the photographic image extracting portion which is displayed on the display device.

(6) The photographic image region extracting apparatus according to (1), wherein the photographic image extracting portion removes a region having a predetermined width from an outer edge of the region of the photographic sheet to specify the region of the photographic image when the margin deciding portion decides that the margin is present.

(7) The photographic image region extracting apparatus according to (1), further comprising a file generator that generates a file to store, in a storage device, image data of the region of the photographic image output by the photographic image extracting portion.

(8) The photographic image region extracting apparatus according to (2), further comprising a shadow detecting portion that detects a shadow generated along a side of the photographic sheet based on luminance information of image data output from the scanner portion,
wherein the photographic sheet extracting portion sets, as a side of a rectangle, at least one side in a vertical direction from which a shadow is detected and sets, as the photographic sheet region, a rectangular region including a region having a lower luminance than a predetermined value when the shadow detecting portion detects the shadow generated along the side.

(9). The photographic image region extracting apparatus according to (2), further comprising a shadow detecting portion that detects a shadow generated along a side of the photographic sheet based on luminance information of image data output from the scanner portion,
wherein the photographic sheet extracting portion sets, as the photographic sheet region, a rectangular region having, as two sides, shadows generated along two adjacent sides of the photographic sheet when the shadow detecting portion detects the shadows generated along the two sides.

(10) The photographic image region extracting apparatus according to (1), further comprising;
- a card slot for attaching a memory card; and
- a storing portion that stores image data extracted from the photographic image extracting portion in the memory card attached to the card slot.

(11) An image processing method comprising:
- outputting image data including a photographic sheet on which a photographic image is fixed by emitting a light to the photographic sheet and reading a light reflected from the photographic sheet; and specifying a region of the photographic image in which a margin around the photographic image is excluded from the photographic sheet based on the output image data.

(12) The method according to (11), wherein in the step of specifying the region of the photographic image, a determination is made whether the margin is present or not based on the output image data.

(13) The method according to (11), wherein the output image data is prescan image data obtained prior to a main scan.

(14) The method according to (11) further comprising extracting a region of the photographic sheet based on the image data output from the scanner,
  wherein the region of the photographic image is specified using the extracted region of the photographic sheet.

(15) The method according to (14), wherein the step of extracting and the step of the specifying are separately executed.

(16) The method according to (11) further comprising generating a file to store, in a storage device, image data of the specified region of the photographic image.

(17) The method according to (11) further comprising:
  regulating a size of the region of the photographic image to be equal to or larger than that of a square printing medium based on image data from which the margin is removed; and
  executing printing over the printing medium based on image data regulated to have the size of the printing medium or more.

(18) A copying apparatus comprising:
  a scanner portion that emits a light to a photographic sheet on which a photographic image is fixed, reads a light reflected from the photographic sheet, and outputs image data including the photographic sheet;
  a margin deciding portion that decides presence of a margin around the photographic image based on the image data including the photographic sheet region extracted by the photographic sheet extracting portion; and
  a photographic image extracting portion that specifies a region the photographic image based on a result of the decision of the margin deciding portion and outputs the specified region of the photographic image;
  an image processing portion that regulates a size of the region of the photographic image to be equal to or larger than that of a printing medium based on image data output from the image extracting portion; and
  a printing portion that executes printing over the printing medium based on image data output from the image processing portion.

(19) The copying apparatus according to (18) further comprising a photographic sheet extracting portion that extracts a region of the photographic sheet based on the image data output from the scanner, wherein the image data includes the margin when the photographic sheet has the margin.

DETAILED DESCRIPTION OF PREFERRED EMBODIMENTS

An aspect of the invention will be described below with reference to the drawings.

Figure 1:
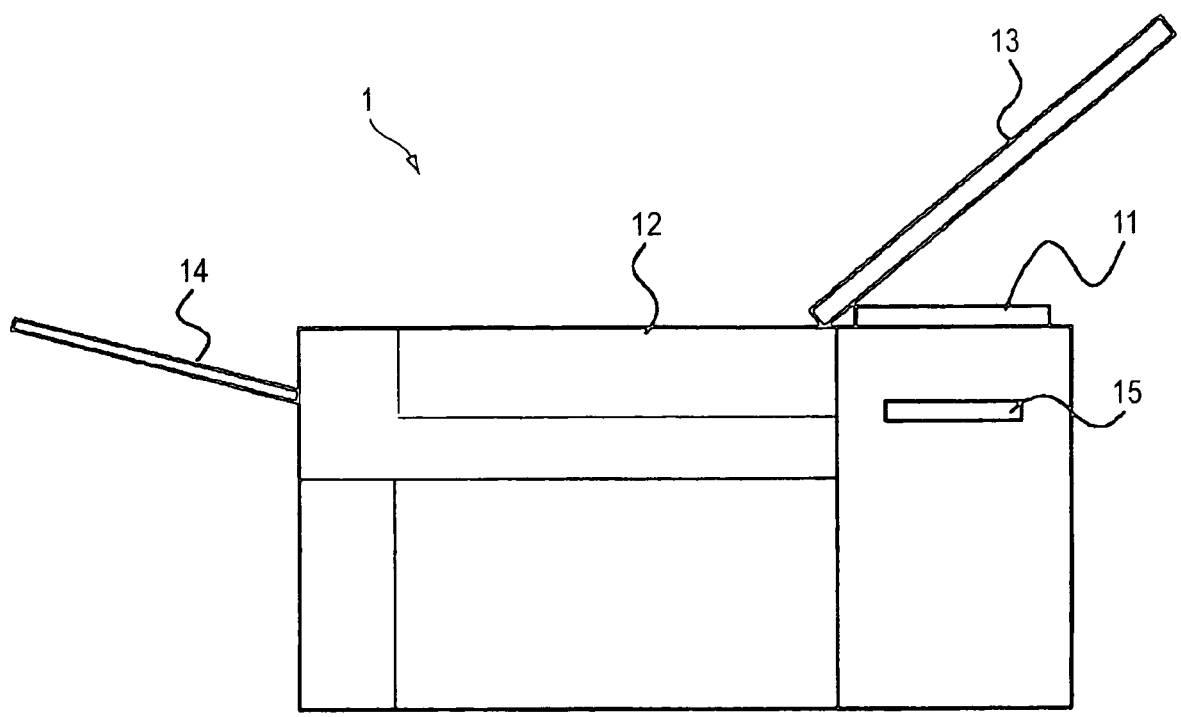
FIG. 1 is a view showing the appearance of a copying apparatus according to an embodiment of the invention.

FIG. 1 is a view showing the appearance of a copying apparatus according to an embodiment of the invention. A copying apparatus 1 has a scanner function for fetching a document such as a document as scan image data and a printer function for converting printing object data such as scan image data or application data into print image data, thereby carrying out printing over a printing paper. The copying apparatus 1 comprises a control device therein and serves to generally carry out a control to implement various functions.

As shown in FIG. 1, a liquid crystal panel to be a display device and various buttons to be input devices are provided on the upper surface of the body of the copying apparatus 1 and a user interface 11 is thus formed. A user can give an instruction for reading and printing a document through the user interface 11 and can set various reading conditions and printing conditions. In the embodiment, furthermore, when an image region is extracted as a preprocessing of printing, the result of the extraction is displayed on the liquid crystal panel, thereby accepting the input of a modification from the user through various operating buttons.

Moreover, the upper surface of the body of the copying apparatus 1 is provided with a document table 12 having a glass plane to mount a document thereon and a cover 13. A light source for emitting a light onto the document mounted on the glass plane of the document table 12 and an optical sensor for receiving the reflected light (neither of which is shown) are provided below the document table 12 as will be described later in detail. When accepting an image reading instruction/printing instruction from the user through the user interface 11, the copying apparatus 1 reads the document mounted on the document table 12 and stores the document as scan image data in a predetermined data format on an internal memory. Subsequently, the copying apparatus 1 carries out printing for a printing paper based on the scan image data stored on the memory. The copying apparatus 1 discharges the printing paper to a paper discharge tray 14 after the printing.

Moreover, a card slot 15 to be an external interface is provided on the front surface of the body of the copying apparatus 1. The card slot 15 is based on the PCMCIA standard, for example, and is constituted in such a manner that a memory card (not shown) based on the standard can be freely attached and removed. When detecting that the memory card is inserted and attached into the card slot 15, for example, the copying apparatus 1 displays a message for promoting to give a print executing instruction to the liquid crystal panel. On the other hand, the user can carry out an operation for setting the printing conditions if necessary, thereby giving a printing instruction. When accepting the printing instruction from the user, the copying apparatus 1 reads the image data recorded in the memory card to carry out the printing over the printing paper. The copying apparatus 1 discharges the printing paper to the paper discharge tray 14 after the printing. Furthermore, it is also possible to extract any of scan image data read by a scanner which are present in the image region and to store the same data in the memory card attached to the card slot 15.

Figure 2:
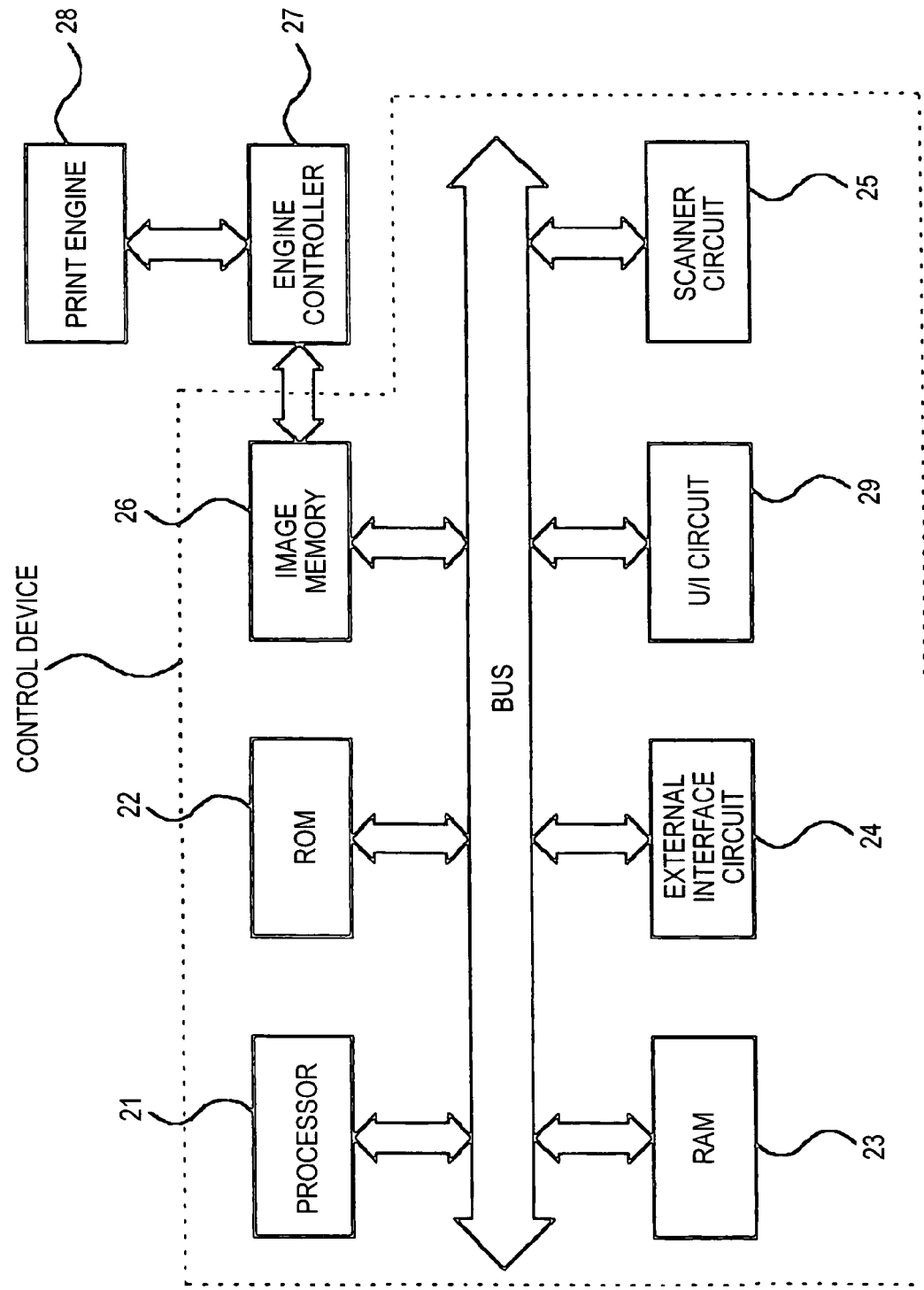
FIG. 2 is a block diagram showing the hardware structure of the copying apparatus according to the embodiment.

FIG. 2 is a block diagram showing the hardware structure of the copying apparatus 1 according to the embodiment. A processor 21 executes various control programs. In other words, various programs stored in an ROM 22 are executed by the processor 21, thereby causing the copying apparatus to implement a predetermined function in cooperation with another hardware. In the embodiment, at least a user interface function, a scanner function, an image generating function and a printing control function are implemented.

An external interface circuit 24 serves to cause the processor 21 to access a memory card 2 attached to the card slot 15. The processor 21 loads image data stored in the memory card into an RAM 23 through the external interface circuit 24 and then generates image data based on the image data in accordance with the set printing conditions.

A scanner circuit 25 serves to read the document mounted on the document table 12 and to fetch the document as scan image data. In the embodiment, a preprocessing is carried out by using image data obtained by prescanning the document through the scanner circuit 25. Based on the result of the preprocessing, the scan image data fetched by scanning (main scan) the document through the scanner circuit 25 again are loaded into the RAM 23 and the processor 21 then generates print image data based on the scan image data in accordance with the set printing conditions. It is possible to use the scanner circuit 25 corresponding to an image input method (a reducing optical system method of reducing and reading a document by means of a lens or a contact optical system method of reading a document in an same magnification by utilizing a CCD having a document width) Moreover, it is also possible to use the scanner circuit 25 corresponding to a predetermined method (a method of combining a monochromatic linear CCD with a color filter or a method utilizing a color linear CCD having a color separating function by itself) in order to read color information of the document. An example of the structure of the scanner circuit 25 will be described below with reference to FIGS. 3A and 3B.

An image memory 26 serves to store print image data which are generated. An engine controller 27 reads the print image data stored in the image memory 26 and supplies the same data to a print engine 28 while controlling the operation of the print engine 28. The engine controller 27 is activated by setting a print executing instruction sent from the processor 21 as a trigger when print image data having a predetermined band width are expanded into the image memory 26, for example.

The print engine 28 is constituted by a paper feeding mechanism or a print head, for example, and serves to carry out printing over a printing medium such as a paper. It is possible to use the print engine 28 corresponding to the type of a printer such as a laser printer or a serial printer.

A user interface circuit 29 serves to control the user interface 11 to be implemented by the liquid crystal panel and various buttons.

Figure 3A:
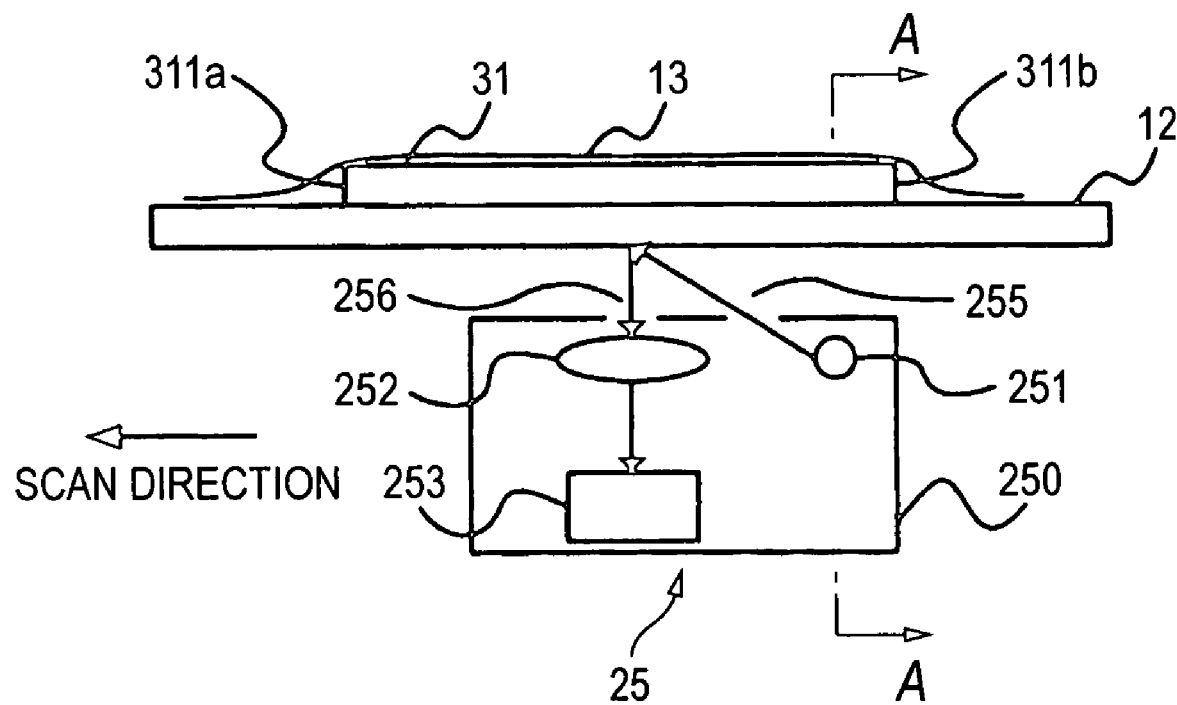
FIGS. 3A and 3B are views showing the structure of a scanner circuit.
Figure 3B:
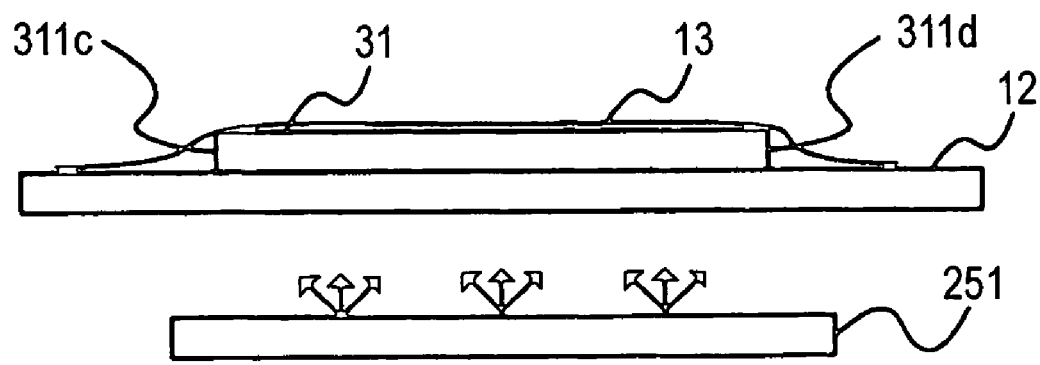

Next, the structure of the scanner circuit 25 will be described with reference to FIGS. 3A and 3B. FIGS. 3A and 3B are schematic sectional views showing the document table 12 and the scanner circuit 25. In the scanner circuit 25, a bar-shaped light source 251, a lens 252 for reducing a light reflected from a document 31 mounted on the document table 12 to form an image, and a CCD 253 for converting the image formed by the lens 252 into an electric signal and outputting image data are stored in a housing 250 having slits 255 and 256. A light emitted from the light source 251 is emitted on the lower surface of the document table 12 through the slit 255. When the document 31 mounted on the document table 12 reflects the emitted light, any of the reflected lights which passes through the slit 256 is incident on the lens 252. In FIG. 3A, the scanner circuit 25 gets on a carriage which is not shown and scans the whole document 31 mounted on the document table 12 from right in a leftward direction in the drawing. It is sufficient that the whole document 31 is scanned by a relative change in the positions of the document 31 and the scanner circuit 25. Therefore, the scanner circuit 25 may be fixed to move the document 31 by means of the paper feeding mechanism.

The document 31 mounted on the document table 12 has a certain thickness. For this reason, a shadow is slightly generated in an outer edge 311 (311a, 311b, 311c and 311d) portion of the document 31 when the light source 251 emits the light. As described above, a light is obliquely emitted from the light source 251 to the document table 12 through the slit 255. Consequently, the shadow is particularly generated greatly in the outer edge 311a portion in many cases.

FIG. 3B is an A-A sectional view of FIG. 3A. As shown in FIG. 3B, a light is emitted from all portions in the bar-shaped light source 251 onto the lower surface of the document table 12. Referring to the outer edges 311c and 311d which are parallel with a scanning direction, a shadow appears or not depending on the size of a clearance between the document table 12 and the cover 13 which is formed in the outer edge 311c and 311d portions when the cover 13 is put on the document table 12. In the following, as shown in FIGS. 5A to 5D, for instance, description will be given by taking, as an example, the case in which a shadow appears on two adjacent sides in a rectangle when a rectangular photographic sheet is mounted as the document 31. The same operation can be carried out also in the case in which the shadow appears in at least three sides in the rectangle or one side in the vertical direction of a photographic image.

Next, description will be given to a processing to be carried out in the case in which a photographic image printed on a photographic sheet is read and is printed without a margin (a blank around the photographic image) by using the copying apparatus 1. A procedure for the whole copy processing will be described with reference to a flowchart in FIG. 4. In this specification, the photographic sheet having the photographic image printed thereon includes a silver salt photograph in addition to the image of digital data fetched into a computer and printed by means of a printer. More specifically, it is sufficient that a photographic image such as an image is fixed onto the photographic sheet by any method.

Figure 5A:
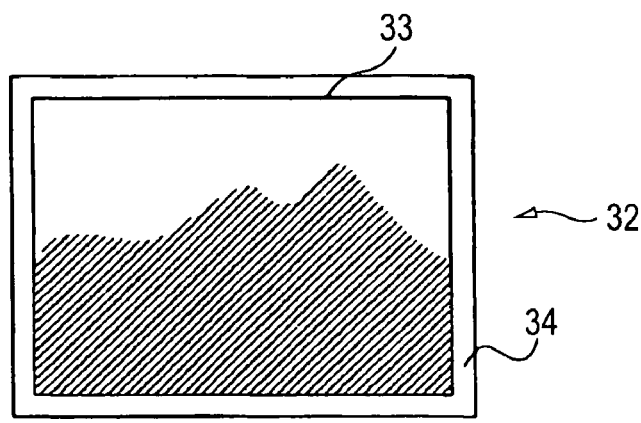
FIGS. 5A to 5D are views typically showing a change in an image in the application of a preprocessing.
Figure 5B:
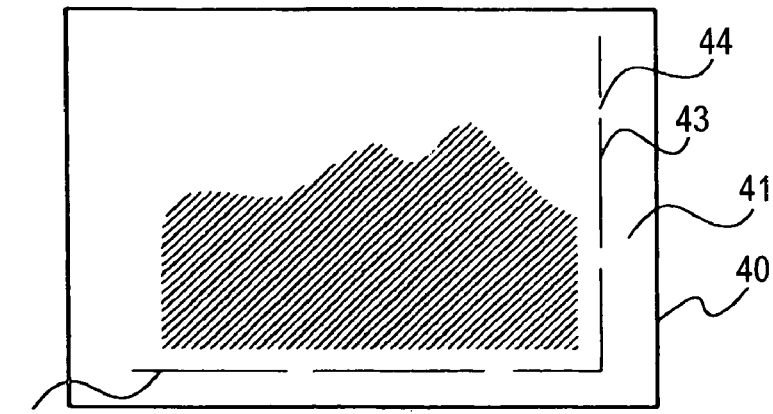

First of all, when receiving an instruction for copy from a user, the scanner circuit 25 prescans a document on the document table 12 to acquire prescan image data for a preprocessing (S101). If the prescan is carried out when a photographic sheet in FIG. 5A is mounted as the document on the document table 12, for example, prescan image data 40 shown in FIG. 5B are obtained. At this time, the processor 21 specifies a photographic image region (a region 75 in FIG. 5D) printed on the photographic sheet based on the prescan image data 40 as the preprocessing (S102). In the preprocessing, whether the photographic sheet of the document is printed with or without a margin, only the photographic image region is specified. The details of the preprocessing will be described below.

After the photographic image region is specified by the preprocessing, the scanner circuit 25 mainly scans the document to acquire scan image data (S103). The processor 21 extracts the scan image data of the 6 photographic image region specified by the preprocessing from the scan image data acquired by the main scan (S104). Consequently, the margin around the photographic image is removed. Then, the processor 21 executes a predetermined processing for the image data extracted at the Step S104 (S105). Thereafter, non-margin printing is carried out (S106).

Before the execution of the Step S103, the image region specified at the Step S102 may be displayed on the user interface 11 to accept a modification from the user. This will also be described below.

Moreover, a plurality of processings may be executed or no processing may be executed at the Step S105. For example, it is also possible to execute a processing of storing the image data extracted at the Step S104 in a memory card or a fading restoring processing.

Furthermore, the following processing may be executed. More specifically, the size of the photographic image region is compared with that of a printing paper based on the image data extracted at the Step S104. Then, it is decided whether the regulation of magnification or reduction is required in such a manner that the size of the photographic image region is equal to or slightly larger than that of the printing paper. The processing of the magnification or reduction is carried out when it is required, and neither the magnification nor the reduction is executed when it is not required. Thus, the printing is carried out at the Step S106. At this time, information of the size of the printing paper may be acquired by referring to data on a printing paper size held previously in the copying apparatus 1.

In the non-margin printing at the Step S106, it is possible to carry out the printing in such a manner that all of four sides of a square printing paper have no margin. Furthermore, the printing may be carried out in such a manner that the margin is not formed on three, two or one of the sides. As a result of the printing carried out at the Step S106, the margin is formed on any of the sides in the case in which the printing is carried out to intentionally form the margin and the case in which the margin is formed unintentionally due to a skew.

Figure 6:
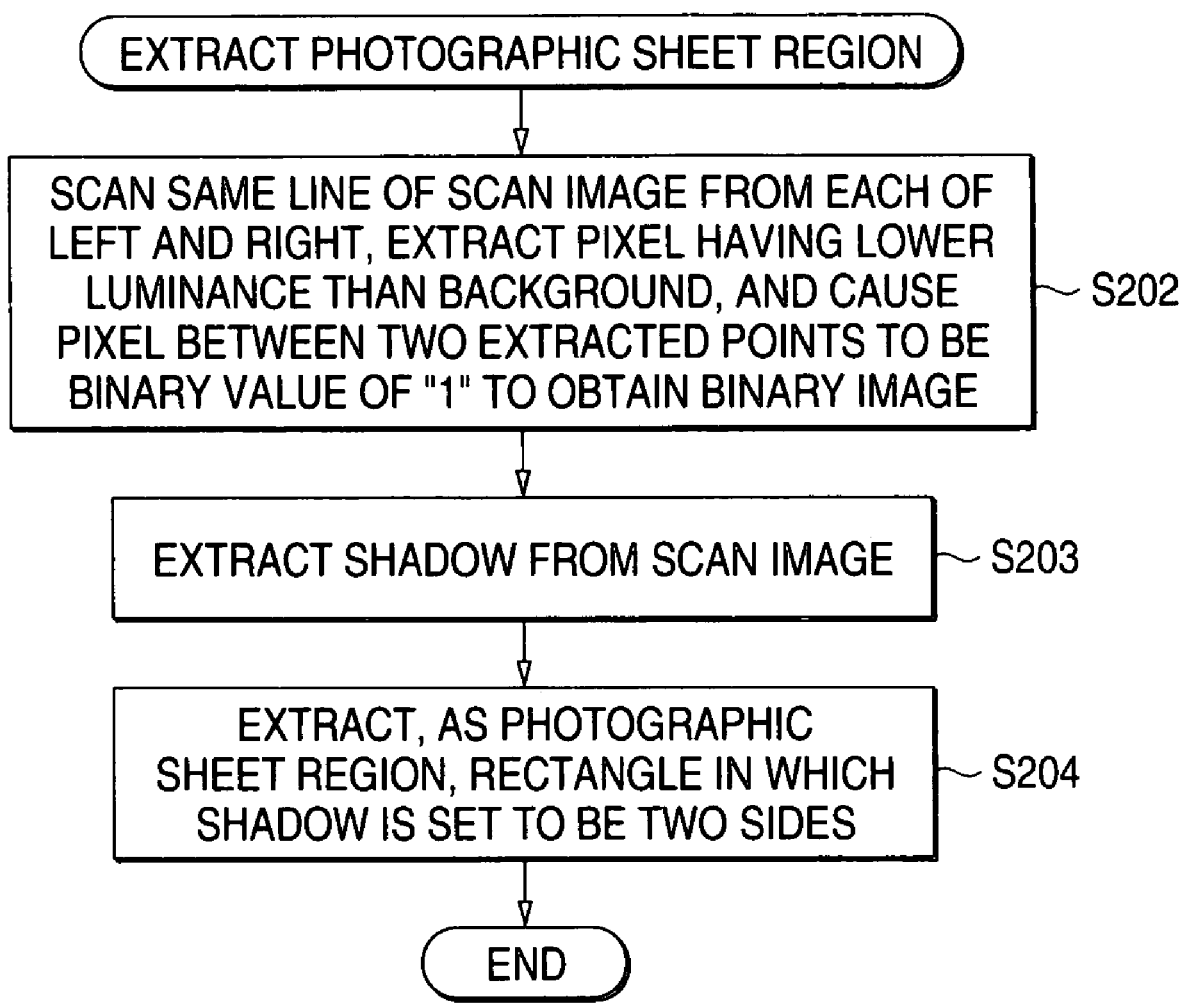
FIG. 6 is a flowchart showing the preprocessing.

Next, the preprocessing of the Step S102 will be described in detail. FIG. 5A is a view showing an example of a photographic sheet 32 to be mounted as a document (an original image) on the document table 12. A photographic image 33 is printed on the photographic sheet 32. A margin 34 is provided around the photographic image 33 in the photographic sheet 32 and so-called margin printing is carried out. As a first stage in the preprocessing, first of all, a photographic sheet region is extracted by using a shadow generated along the side of the photographic sheet region from prescan image data. A procedure for the photographic sheet region extraction processing will be described with reference to a flowchart in FIG. 6.

Figure 4:
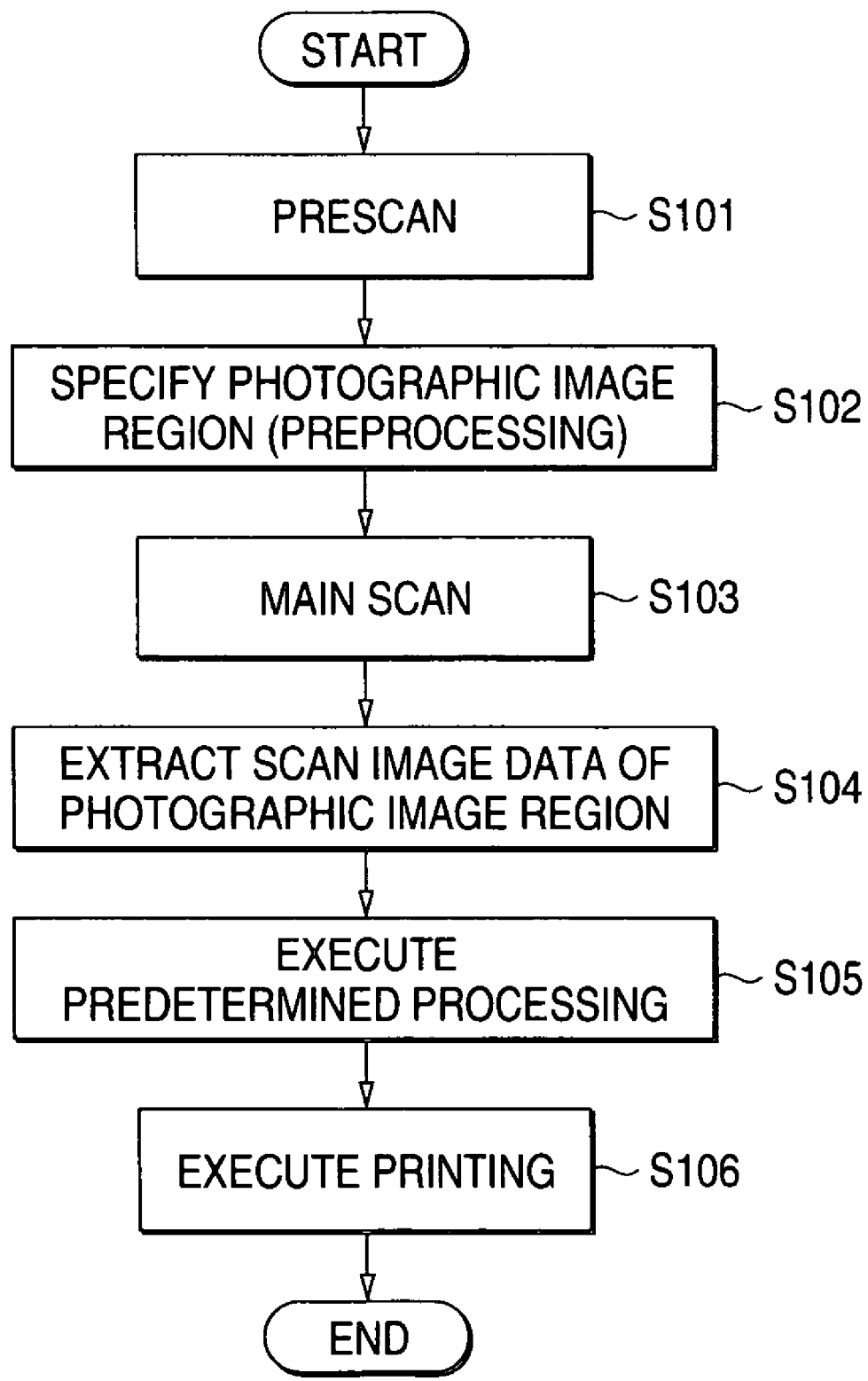
FIG. 4 is a flowchart showing a processing procedure for executing copying.

First of all, the photographic sheet 32 is mounted on the document table 12 and the scanner circuit 25 prescans the photographic sheet 32 to acquire scan image data in order to carry out a photographic sheet region extraction processing (S101 in FIG. 4). The scan image data are color image data having R (red), G (green) and B (blue), for example, and are stored in the RAM 23.

FIG. 5B shows the scan image 40 read by the scanner circuit 25. As shown in FIG. 5B, the scan image 40 includes an image in a photographic sheet region and a background region (other than the photographic sheet region) 41. Shadows 42 and 43 of the outer edges of the photographic sheet which are generated by the presence of the thickness of the photographic sheet 32 appear on the lower and right sides of the photographic sheet region. The shadows 42 and 43 also have broken portions (for example, 44) in places.

Next, the scan image 40 is binarized by using a luminance determined based on the weighted average of the R, G and B values of each pixel in the scan image data in FIG. 5B so that a binary image is obtained (S202) The binary processing is carried out in the following manner, for example. More specifically, a line in a transverse direction in the drawing on the scan image 40 is scanned from each of left and right to decide a luminance level. In the decision of the luminance level, for example, it is decided whether the luminance level of a certain pixel on the line is lower than that of the background portion 41 by a predetermined level or more or whether the luminance level of the pixel is equal to or lower than a predetermined luminance level. A pixel (a left extraction pixel) extracted as a result of the luminance level decision when scanning the line from left and a pixel (a right extraction pixel) extracted as a result of the luminance level decision when scanning the line from right in the same manner are set to be "1" (an image is present) Furthermore, all pixels on the line between the left extraction pixel and the right extraction pixel are set to be "1" (an image is present). On the same line, a left pixel from the left extraction pixel and a right pixel from the right extraction pixel are set to be "0" (no image) and a binary value is thus obtained. This processing is carried out for all lines in the transverse direction of the scan image 40 and the whole scan image 40 is caused to be binary so that a binary image 50 is generated. The binary image 50 obtained by the application of the processing to the scan image 40 in FIG. 5B is shown in FIG. 5C.

Figure 5C:
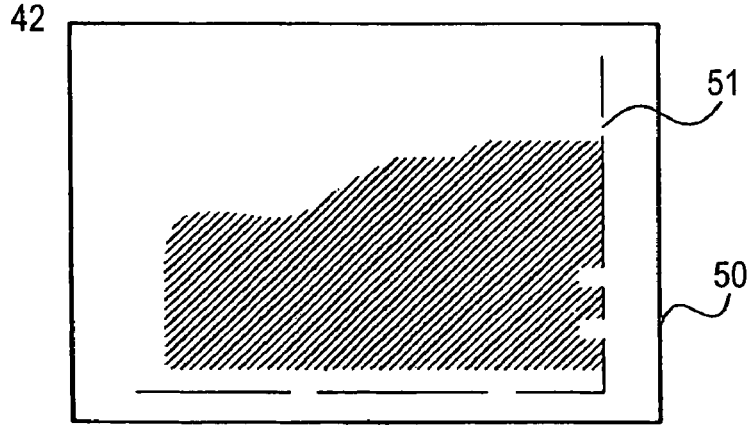
Figure 5D:
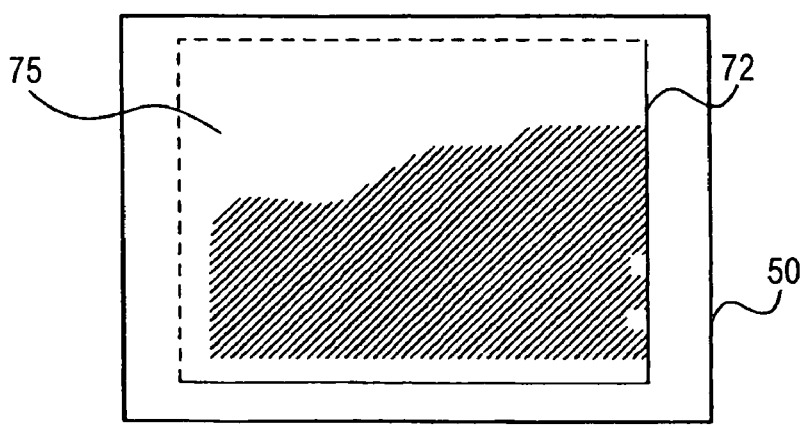

Referring to the binary image 50 in FIG. 5C, the portion in which the shadow is broken in the scan image 40 is not set to be "an image is present ("1")" as in 51, for example. By using the scan image 40 in FIG. 51 or the binary image 50, a processing of extracting a shadow is carried out (S203). In FIG. 7, description will be given to a detailed procedure for carrying out the shadow extraction processing by using the scan image 40.

Figure 7A:
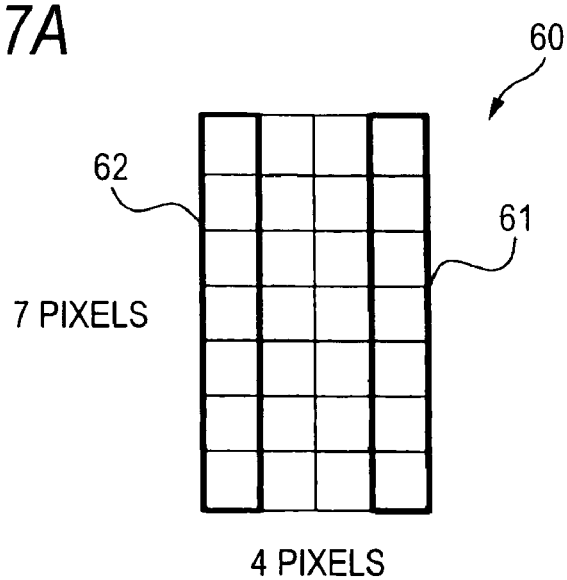
FIGS. 7A and 7B are views for explaining a shadow extraction processing.
Figure 7B:
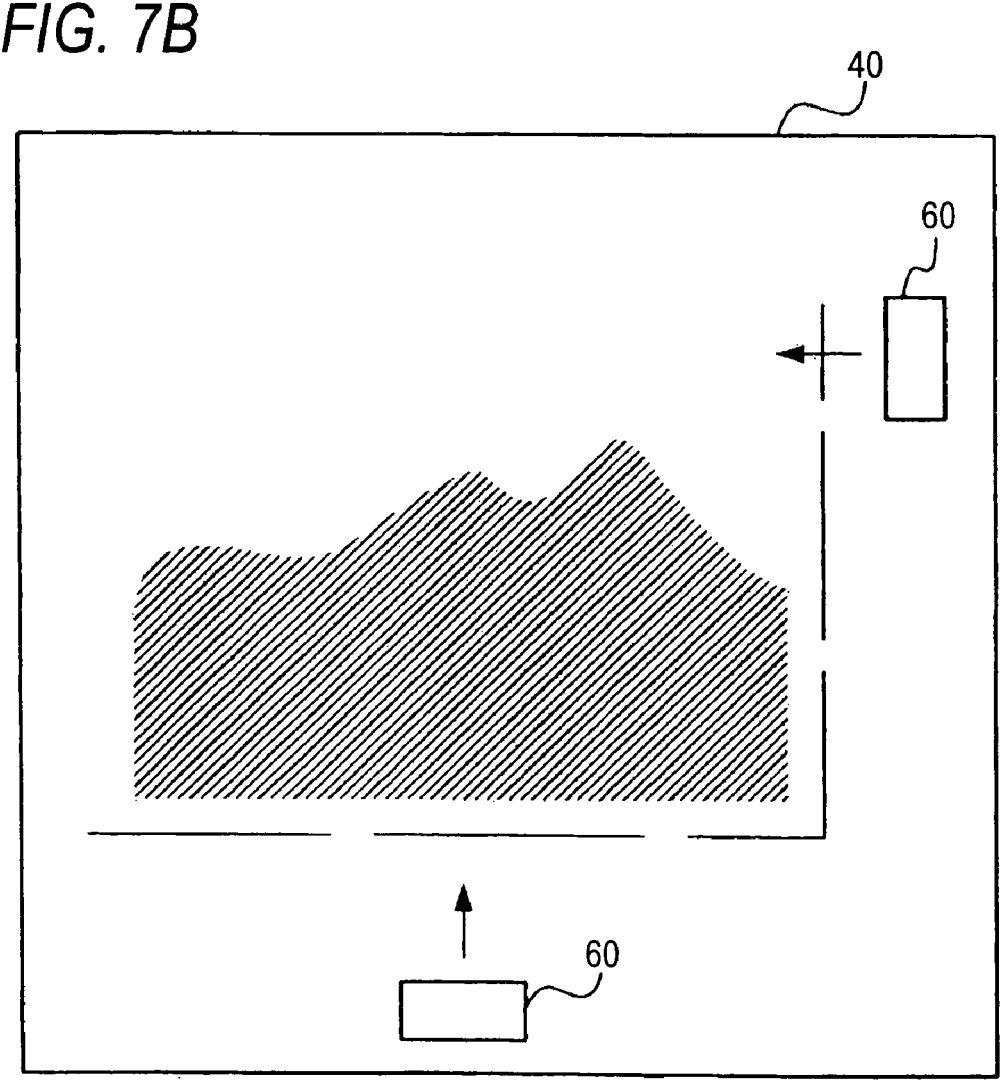

FIG. 7A shows an example of a mask 60 to be used in the shadow extraction processing. The mask 60 takes a size of 4-pixel wide and 7-pixel long, for example. In this processing, first of all, the mask 60 is applied from right toward left in the scan image 40 (that is, from a side on which a shadow is generated) as shown in FIG. 7B. At this time, the average value of luminance for 7 pixels in a leftmost line 62 of the mask 60 is obtained. When at least five of seven pixels in a rightmost line 61 have lower luminance than the average value of the leftmost line 62 by a predetermined level or more, it is decided that all of the seven pixels in the line 61 constitute the shadow. This processing is carried out for all of the pixels of the scan image 40 while the mask 60 is moved. Consequently, the shadow 43 appearing on the right of the photographic sheet 32 is extracted.

Figure 10:
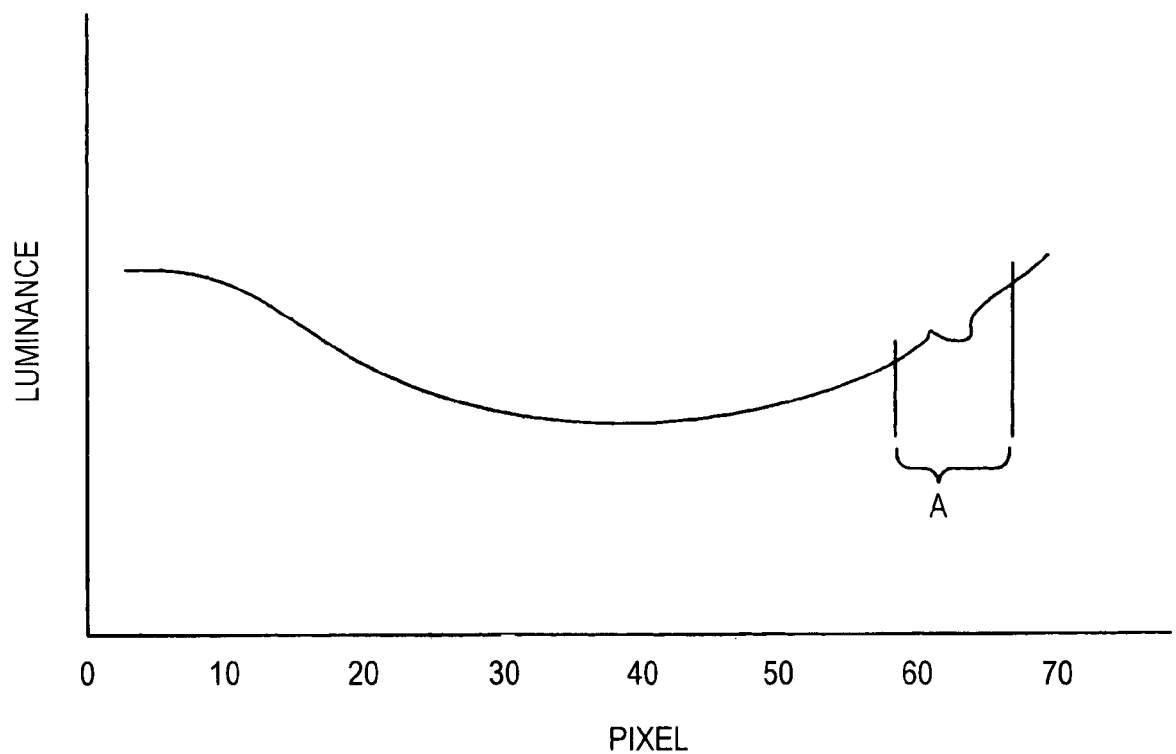
FIG. 10 is a chart for explaining a shadow extraction processing.

In some cases, the pixels of the scan image 40 which are arranged in horizontal and vertical directions have a fluctuation in the luminance having a long cycle as shown in FIG. 10 depending on a scanner. In FIG. 10, an axis of abscissa indicates a distance represented by the number of pixels in the horizontal direction or the vertical direction from the optional point of the scan image 40 and an axis of ordinate indicates a luminance. For scan data in which a luminance value is thus changed in the long cycle, accordingly, it is hard to extract a shadow by using the absolute value of the luminance. In this case, therefore, it is necessary to extract, as a shadow, a portion in which the luminance is relatively dropped within a predetermined small range (A in the drawing, for example). In this case, the shadow is extracted by using the mask 60 in the following manner, for example. In other words, the average value and distribution of a luminance is obtained for each of the seven pixels in the line 61 and the seven pixels in the line 62. When a difference between the respective average values is equal to or greater than a predetermined value and each dispersion is present within a predetermined range, it is possible to decide that the seven pixels in the line 61 constitute a shadow.

Next, the mask 60 is rotated rightward at 90 degrees and is applied upward from the bottom of the scan image 40 (in other words, a side on which a shadow is generated also in this case), and the same processing as described above is carried out to extract the lower shadow 42 of the photographic sheet 32.

When the shadow extraction processing is to be carried out by using the binary image 50, it is also possible to make a decision as to whether the number of pixels of "1" in the line 61 is equal to or larger than a predetermined number in place of the average of the luminance value.

By the processing, a shadow image is generated by setting, as "1", a pixel decided to be a shadow and setting, as "0", the other pixels.

Figure 8B:
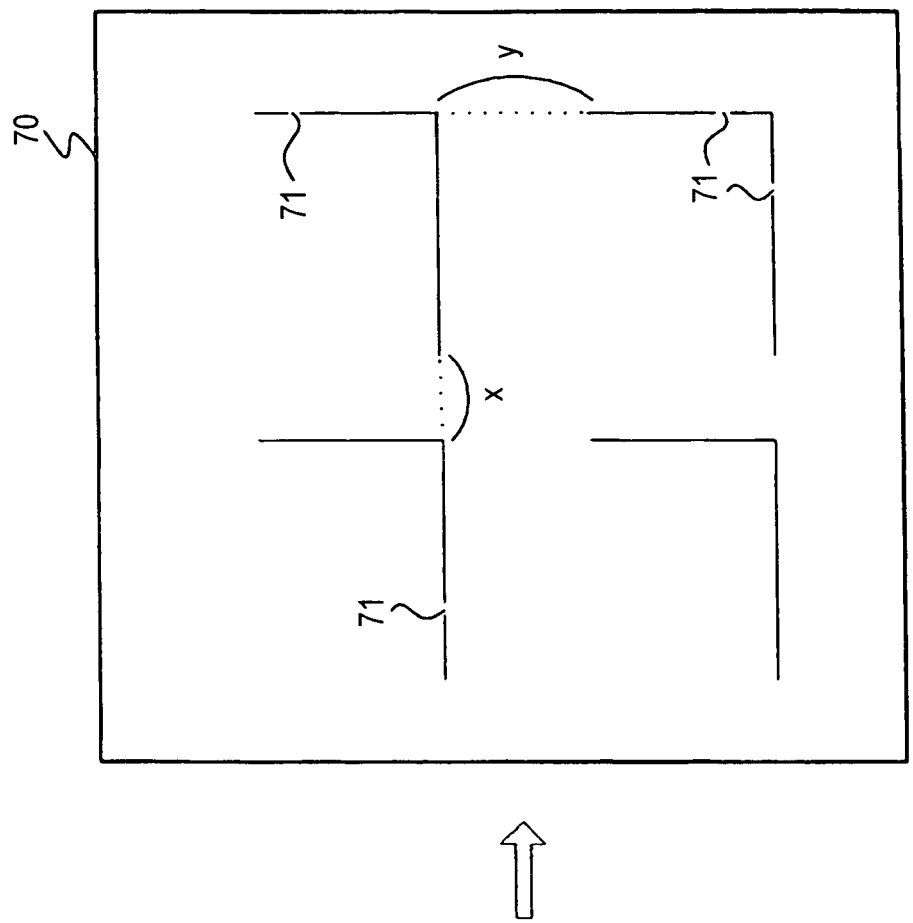
FIGS. 8A and 8B are views for explaining the shadow extraction processing.
Figure 8A:
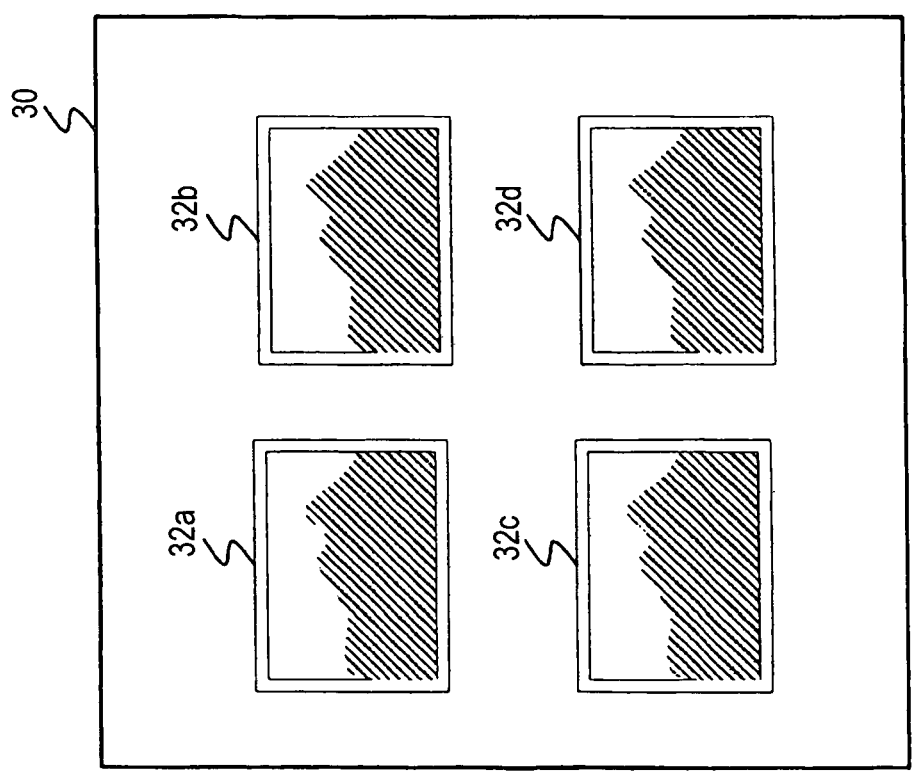

When the shadow extraction processing is applied to a scan image obtained by scanning an original image 30 including a plurality of photographic sheets 32a to 32d shown in FIG. 8A, for example, it is possible to obtain a shadow image 70 shown in FIG. 8B. Even if the processing is carried out to extract a shadow as shown in FIG. 8B, a portion 71 having the shadow broken remains in some cases. Therefore, a processing of interpolating the broken portion 71 is further carried out.

More specifically, when the portion 71 having the shadow broken is detected in the shadow image 70, a distance of an interval is measured and is compared with a predetermined threshold. When the distance of the interval of the portion 71 having the shadow broken is equal to or smaller than a predetermined value, this is connected. It is suitable that the threshold should be set to be 5 mm, for example. This corresponds to the fact that the width of a margin has a maximum value of 5 mm when printing with the margin is carried out over the photographic sheet. Consequently, intervals x and y formed between the photographic sheets cannot be connected to each other but the interval between the photographic sheets and the portion 71 having the shadow broken can be clearly distinguished from each other.

Referring to FIGS. 5A to 5D again, when the binary image 50 in FIG. 5C is superposed on a shadow image 72 obtained by the shadow extraction processing, an image shown in FIG. 5D is obtained. In the shadow 72 and the binary image 50, a region 75 taking the shape of a rectangle inscribed on all pixels set to be "1" or a rectangle in which the shadow 72 is set to be two sides is extracted as the photographic sheet region (a region surrounded by the shadow 72 and a broken line) 75. When only shadow images corresponding to the shadows 42 and 43 along the sides in the transverse direction or the vertical direction are obtained by the shadow extraction processing, the region of the rectangle inscribed on all of the pixels set to be "1" in the shadow and the binary image 50 may be extracted as the photographic sheet region. In the case in which a plurality of photographic sheets is included in the original image as shown in the example of FIGS. 8A and 8B, furthermore, the photographic sheet regions are extracted by the processing, respectively.

Figure 9:
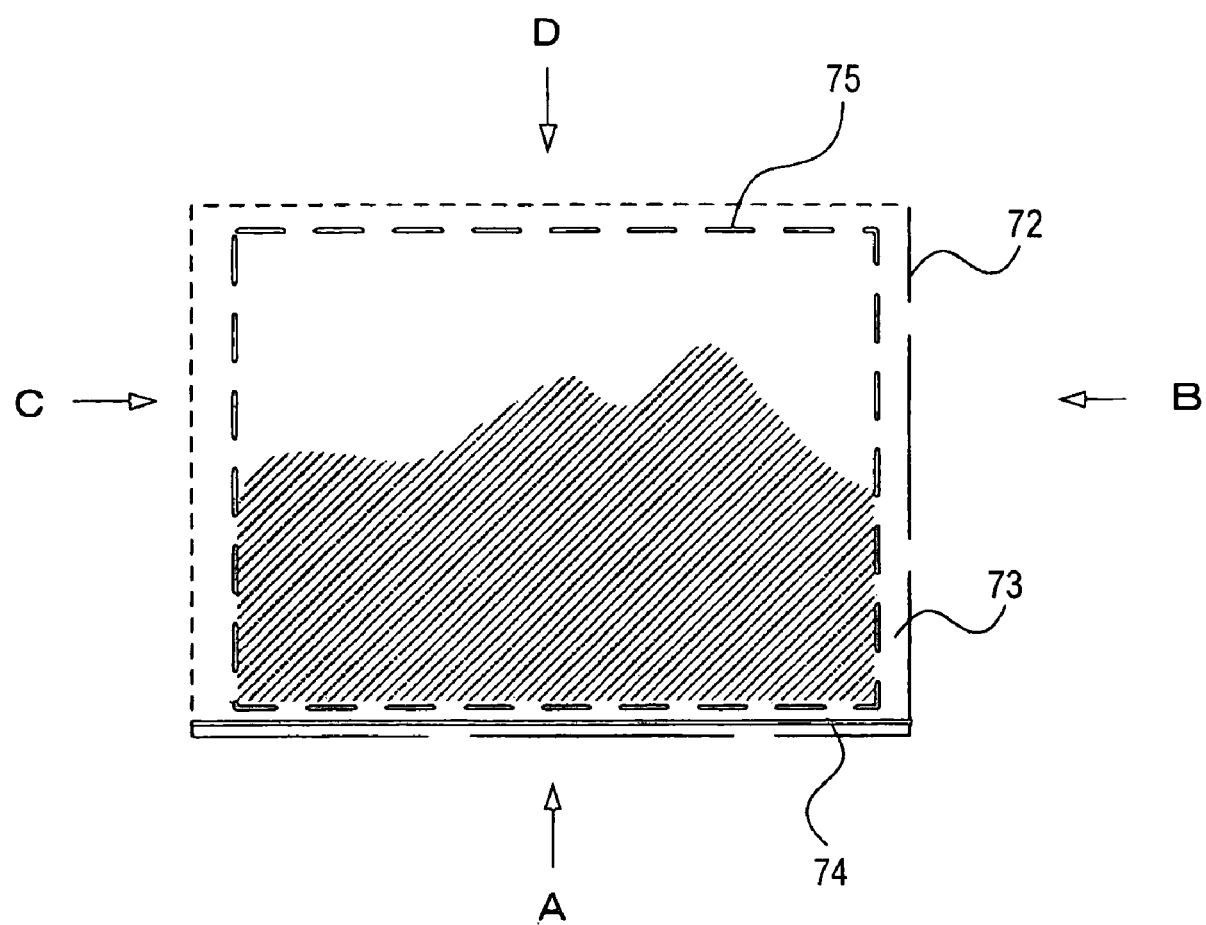
FIG. 9 is a view for explaining a processing of extracting a photographic image region from a photographic sheet region.

As a second stage of the preprocessing succeeding to the first stage of the preprocessing, next, the presence of the margin is decided by using the image data in the photographic sheet region which are extracted in the processing at the first stage and a photographic image region including no margin is specified therefrom and is thus extracted. A specific processing will be described with reference to FIG. 9. With reference to FIG. 9, it is apparent that a region 73 corresponding to a margin is also included in the image of the photographic sheet region 72 which is extracted when the photographic sheet of an original image has the margin. In this case, therefore, the margin region 73 is removed from the whole photographic sheet region 72 to extract only the photographic image region 75. A procedure for removing the margin region 73 is carried out in the following manner, for example. In the following, description will be given to the case in which a shadow is generated on a lower side most easily and is generated on a right side secondarily easily. If the order of the sides on which the shadow is generated easily is varied, accordingly, it is suitable that the order for deciding the presence of a margin region should be changed correspondingly.

As a first processing procedure for removing the margin region, the presence of the margin region 73 is decided in order of a lower side, a right side, a left side and an upper side (A to D) in the photographic sheet region 72, and the margin region 73 is removed when it is decided that the margin region 73 is present.

Figure 11:
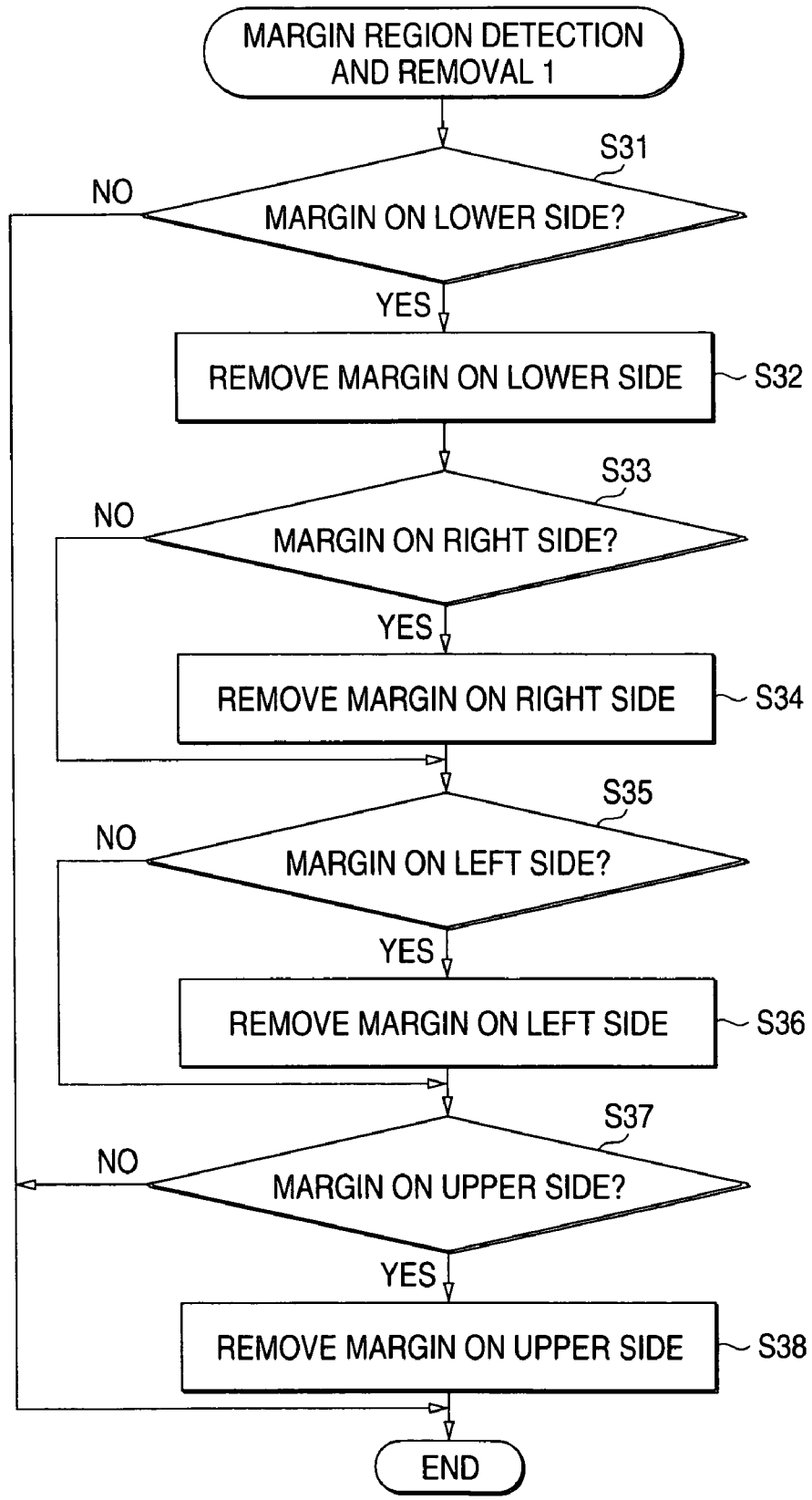
FIG. 11 is a flowchart for explaining the shadow extraction processing.

FIG. 11 is a flowchart showing the first processing procedure. More specifically, the presence of a margin region is decided for the lower side of the photographic sheet region 72 (S31). For the decision of the presence of the margin region, in case of the lower side, for example, a luminance is checked for a pixel on a line 74 at an inside from the outer edge of the lower side by approximately 3 mm, and it is decided that there is no margin when the number of pixels having a predetermined luminance level or less is larger than a predetermined rate. To the contrary, it is also possible to decide that the margin is present when the number of the pixels having the predetermined luminance level or less does not satisfy the predetermined rate. To decide the margins of the right side, the left side and the upper side, the same processing procedure is executed.

When it is decided that the margin region is present at the Step S31 (S31: Yes), a region having a predetermined width (for example, 5 mm) is removed from the lower side corresponding to the margin region (S32) On the other hand, when it is decided that there is no margin on the lower side (S31: No), the presence of the margin is not decided for the other sides but the margin removal processing is ended. The presence of the margin can be recognized most clearly on the lower side. When the margin is not detected on the lower side, consequently, this document is regarded to have no margin.

When the margin region is removed from the lower side at Step S32, moreover, the presence of the margin region is subsequently decided for the right side (S33) When it is decided that the margin region is present (S33: Yes), then, a region having a predetermined width is removed from the right side corresponding to the margin region (S34). When it is decided that there is no margin region (S33: No), the Step S34 is skipped.

For the left and upper sides, the presence of the margin region is decided in the same manner as the right side and a removal processing thereof is carried out as shown in FIG. 11 (S35 to S38). Although the processing is executed in order of the right side, the left side and the upper side for the three sides other than the lower side on which the shadow is generated most greatly, this order does not need to be always employed.

Figure 12:
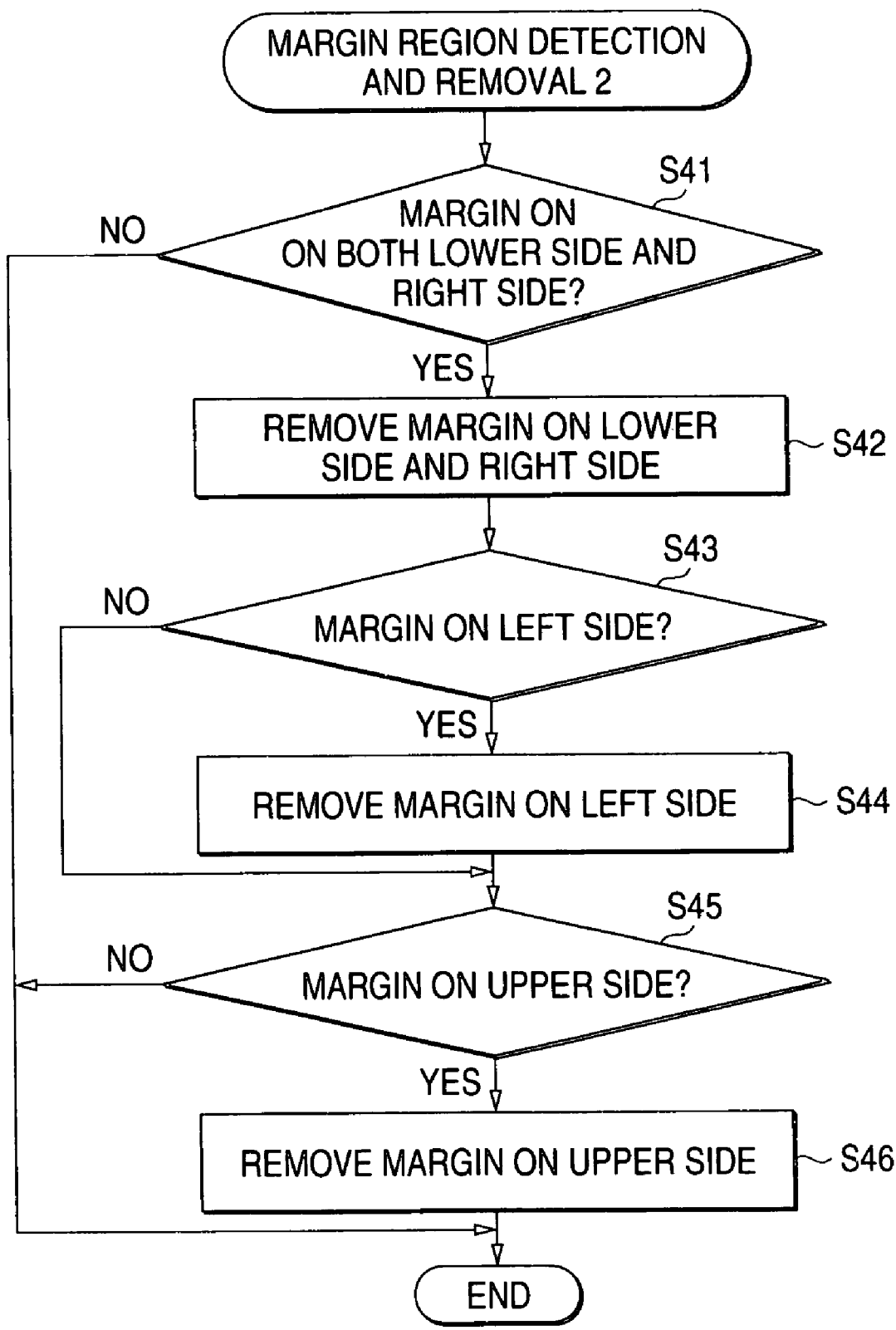
FIG. 12 is a flowchart for explaining a processing of extracting a photographic image region from a photographic sheet region.

Next, a second processing procedure for removing the margin region will be described with reference to a flowchart in FIG. 12.

First of all, the presence of the margin region is decided for both of the lower and right sides on which the shadow is easily generated (S41). When it is decided that both or either of the lower and right sides have/has no margin (s41: No), the presence of the margin is not decided for the other sides but the margin removal processing is ended. When the margin is not detected on either of the lower and right sides on which the shadow is easily generated, consequently, this document is regarded to have no margin.

On the other hand, when it is decided that both of the lower and right sides have the margin (S41: Yes), the margin removal processing is executed for the lower and right sides respectively (S42). Subsequently, the presence of the margin region is decided for each of the left and upper sides in the same manner as in the case of the first processing procedure (S43, S45). When it is decided that the margin region is present, each margin region is removed (S44, S46). Although the margin region is decided and removed in order of the left side and the upper side, the order may be reversed.

If it is decided that the margin is present on both of the lower and right sides at the Step S41, it can be supposed that there is a high possibility that the document might have the margin. In this case, it can also be supposed that the left and upper sides are unconditionally regarded to have the margin and the margin removal processing is thus executed. In the embodiment, however, the presence of the margin is decided for each side. The reason is that the margin region and the background are distinguished from each other with difficulty for the sides on which the shadow is hard to appear. Consequently, there is a possibility that the margin region might be erroneously regarded to be the background and might be thus removed in a processing of detecting a photographic sheet region. In other words, the photographic sheet region which is detected does not include the margin region to be contained originally in some cases. For the sides on which the shadow appears with difficulty, therefore, it is preferable to decide the presence of the margin on each of the sides as described above.

In S41, S44 and S46, the margin removal processing is executed such that a region having a predetermined width (for example, 5 mm) is removed from the side corresponding to the margin region. Alternatively, the margin removal processing may be executed such that when it is decided that the margin is present, a margin width detector detects a width of the margin and a region having the width detected by the margin width detector is removed from the side corresponding to the margin region.

In the above-mentioned manner, the margin region is removed from the photographic sheet region. Consequently, the region 75 surrounded in the thick broken line of FIG. 9 is finally specified to be the photographic image region.

The photographic image region specified as described above may be modified by a user. In the case in which the modification is to be carried out, the processor 21 displays the prescan image 40 and the image indicative of the photographic image region 75 extracted as described above in a superposition on the display screen of the user interface 11. When an input for a modification such as the magnification and reduction of the photographic image region from a user is accepted through the user interface 11, the processor 21 modifies the photographic image region based on the input of the modification.

Moreover, it is also possible to store image data in the photographic image region in a predetermined storage medium. In this case, the processor 21 generates a file in accordance with a predetermined file system in order to store image data to be a printing object in the storage medium. The file thus generated is stored in the memory card attached to the card slot 15, for example. The generation of the file and the attachment to the memory card may be carried out before or after the execution of printing. Furthermore, the copying apparatus 1 may store the image data of the photographic image region in the storage medium without carrying out the printing. More specifically, in this case, the copying apparatus 1 functions as a scanner apparatus. Moreover, the storage medium storing the image data of the photographic image region may be a storage medium provided in the copying apparatus 1 in addition to the memory card which can be freely attached to and removed from the card slot 15.

As described above, it is possible to specify the region of a photographic image printed on a photographic sheet by applying the processings to image data obtained by a prescan, Consequently, the copying apparatus 1 according to the embodiment can carry out copying without a margin irrespective of the presence of the margin of the photographic sheet of an original image as described above.

The embodiment according to the invention is illustrative for the description of the invention and the scope of the invention should not be construed to be restricted to only the embodiment. The skilled in the art can execute the invention in various other modes without departing from the gist of the invention.

What is claimed is:

1. A photographic image region extracting apparatus comprising:

a scanner portion that includes a bar-shaped light source and that causes the light source to move relative to a photographic sheet on which a photographic image is fixed and to obliquely emit a light to the photographic sheet, wherein the scanner portion reads a light reflected from the photographic sheet and outputs image data corresponding to the photographic sheet;

a shadow detecting portion that detects a shadow generated along at least one side of a plurality of sides of the photographic sheet based on luminance information of the image data output from the scanner portion;

a photographic sheet extracting portion that extracts a region of the photographic sheet based on the image data output by the scanner portion and the shadow detected by the shadow detecting portion, wherein, if the shadow detected based on the luminance information includes a broken portion wherein a shadow is broken, and if a distance of the broken portion is equal to or smaller than a predetermined value, then the shadow detecting portion carries out a process of interpolating the broken portion to connect the broken shadow;

a margin deciding portion that decides whether or not a margin is present at one of the sides of the photographic sheet, which is a side around which a shadow is generated most easily by the light obliquely emitted from the light source, based on image data of the region of the photographic sheet extracted by the photographic sheet extracting portion; and a photographic image extracting portion that specifies a region of the photographic image based on a result of the decision of the margin deciding portion and outputs the specified region of the photographic image.

2. The photographic image region extracting apparatus according to claim 1, wherein the image data output from the scanner portion includes the margin when the photographic sheet has the margin.

3. The photographic image region extracting apparatus according to claim 2, wherein the photographic image extracting portion specifies the region of the photographic sheet to be the region of the photographic image when the side having the shadow is not provided with the margin.

4. The photographic image region extracting apparatus according to claim 1, further comprising:
a display device that displays the region of the photographic image extracted by the photographic image extracting portion; and
an input device that accepts a modification input to modify the region of the photographic image extracted by the photographic image extracting portion which is displayed on the display device.

5. The photographic image region extracting apparatus according to claim 1, wherein the photographic image extracting portion removes a region having a predetermined width from an outer edge of the region of the photographic sheet to specify the region of the photographic image when the margin deciding portion decides that the margin is present.

6. The photographic image region extracting apparatus according to claim 1, further comprising a file generator that generates a file to store, in a storage device, image data of the region of the photographic image output by the photographic image extracting portion.

7. The photographic image region extracting apparatus according to claim 2, wherein the photographic sheet extracting portion sets, as a side of a rectangle, at least one side in a vertical direction from which a shadow is detected and sets, as the region of the photographic sheet, a rectangular region including a region having a lower luminance than a predetermined value when the shadow detecting portion detects the shadow generated along the side.

8. The photographic image region extracting apparatus according to claim 2, wherein the photographic sheet extracting portion sets, as the region of the photographic sheet, a rectangular region having, as two sides, shadows generated along two adjacent sides of the photographic sheet when the shadow detecting portion detects the shadows generated along the two sides.

9. The photographic image region extracting apparatus according to claim 1, further comprising:
a card slot for attaching a memory card; and
a storing portion that stores image data extracted from the photographic image extracting portion in the memory card attached to the card slot.

10. An image processing method comprising:
outputting image data, by a scanner, corresponding to a photographic sheet on which a photographic image is fixed by moving a bar-shaped light source relative to the photographic sheet, obliquely emitting a light to the photographic sheet and reading a light reflected from the photographic sheet;
detecting, by a shadow detector, a shadow generated along at least one side of a plurality of sides of the photographic sheet based on luminance information of the image data output from the scanner;
if the shadow detected based on the luminance information includes a broken portion wherein a shadow is broken, and if a distance of the broken portion is equal to or smaller than a predetermined value, then carrying out, by the shadow detector, a process of interpolating the broken portion to connect the broken shadow;
extracting, by a photographic sheet extractor, a region of the photographic sheet based on the image data output by the scanner and the shadow detected by the shadow detector;
determining, by a margin detector, whether or not a margin is present at one of the sides of the photographic sheet, which is a side around which a shadow is generated most easily by the light obliquely emitted from the light source, based on image data of the region of the photographic sheet extracted by the photographic sheet extracting portion;
specifying, by a photographic image extractor, a region of the photographic image in which the margin around the photographic image is excluded from the photographic sheet based on data result of the determination, and outputting, by the photographic image extractor, the region of the photographic image.

11. The method according to claim 10, wherein the output image data is prescan image data obtained prior to a main scan.

12. The method according to claim 10 further comprising extracting, by the photographic image extractor, a region of the photographic sheet based on the image data output from the scanner,
wherein the region of the photographic image is specified using the extracted region of the photographic sheet.

13. The method according to claim 12, wherein the step of extracting and the step of the specifying are separately executed.

14. The method according to claim 10 further comprising generating a file, by a file generator, to store, in a storage device, image data of the specified region of the photographic image.

15. The method according to claim 10 further comprising:
regulating, by a regulator, a size of the region of the photographic image to be equal to or larger than that of a square printing medium based on image data from which the margin is removed; and
executing printing, by a printer, over the printing medium based on image data regulated to have the size of the printing medium or more.

16. A copying apparatus comprising:
a scanner portion that includes a bar-shaped light source and that causes the light source to move relative to a photographic sheet on which a photographic image is fixed and to obliquely emit a light to the photographic sheet, wherein the scanner portion reads a light reflected from the photographic sheet and outputs image data corresponding to the photographic sheet;
a shadow detecting portion that detects a shadow generated along at least one side of a plurality of sides of the photographic sheet based on luminance information of the image data output from the scanner portion, wherein if the shadow detected based on the luminance information includes a broken portion wherein a shadow is broken, and if a distance of the broken portion is equal to or smaller than a predetermined value, then the shadow detecting portion carries out a process of interpolating the broken portion to connect the broken shadow;
a photographic sheet extracting portion that extracts a region of the photographic sheet based on the image data output by the scanner portion and the shadow detected by the shadow detecting portion;

a margin deciding portion that decides whether or not a margin is present at one of the sides of the photographic sheet, which is a side around which a shadow is generated most easily by the light obliquely emitted from the light source, based on image data of the region of the photographic sheet extracted by the photographic sheet extracting portion; and a photographic image extracting portion that specifies a region the photographic image based on a result of the decision of the margin deciding portion and outputs the specified region of the photographic image;

an image processing portion that regulates a size of the region of the photographic image to be equal to or larger than that of a printing medium based on image data output from the image extracting portion; and a printing portion that executes printing over the printing medium based on image data output from the image processing portion.

17. The copying apparatus according to claim 16, wherein the image data output from the scanner portion includes the margin when the photographic sheet has the margin.

18. The photographic image region extracting apparatus according to claim 1, wherein if the margin deciding portion decides that a margin is not present at one of the sides of the photographic sheet, then the margin deciding portion decides that a margin is not present around the photographic image without deciding whether or not a margin is not present at one of the other sides of the photographic sheet.

* * * * *